(12) United States Patent
Brantner (10) Patent No.: US 11,577,265 B2
(45) Date of Patent: Feb. 14, 2023

(54) WORKPIECE TURNTABLE

(71) Applicant: Brian Brantner, San Tan Valley, AZ (US)

(72) Inventor: Brian Brantner, San Tan Valley, AZ (US)

( * ) Notice: Subject to any disclaimer, the term of this patent is extended or adjusted under 35 U.S.C. 154(b) by 0 days.

(21) Appl. No.: 17/376,044

(22) Filed: Jul. 14, 2021

(65) Prior Publication Data

US 2023/0013287 A1    Jan. 19, 2023

(51) Int. Cl.
| | |
|---|---|
| B05B 13/02 | (2006.01) |
| B05C 13/02 | (2006.01) |
| F16M 11/04 | (2006.01) |
| F16M 11/24 | (2006.01) |
| F16M 11/08 | (2006.01) |

(52) U.S. Cl.
CPC .......... *B05B 13/0228* (2013.01); *B05C 13/02* (2013.01); *F16M 11/041* (2013.01); *F16M 11/08* (2013.01); *F16M 11/24* (2013.01)

(58) Field of Classification Search
CPC ............ B05B 13/0228; B05B 13/0285; F16M 11/041; F16M 11/08; F16M 11/24; B05C 13/02
See application file for complete search history.

(56) References Cited

U.S. PATENT DOCUMENTS

| | | | | | |
|---|---|---|---|---|---|
| 2,453,443 | A | * | 11/1948 | Logan ................... | A47B 11/00 108/150 |
| 2,857,224 | A | * | 10/1958 | Del Re .................. | A47G 23/08 108/140 |
| 4,183,511 | A | * | 1/1980 | Marek .................... | B66C 23/48 269/71 |
| 5,707,450 | A | * | 1/1998 | Thompson .......... | B05B 13/0285 118/500 |
| 7,445,184 | B1 | * | 11/2008 | Johnson ............. | B05B 13/0285 248/176.1 |
| 9,016,664 | B1 | * | 4/2015 | Powers ................ | B25H 1/0007 254/8 R |
| 2017/0232463 | A1 | * | 8/2017 | Phillippi ................. | B05B 15/80 118/500 |

FOREIGN PATENT DOCUMENTS

CN    109833999 A    *    6/2019    .........    B05B 13/0228

\* cited by examiner

*Primary Examiner* — Tan Le
(74) *Attorney, Agent, or Firm* — Morgan Law Offices, PLC (57) ABSTRACT

A workpiece turntable comprises a turntable module and an attachable floor-engaging support. The floor-engaging support is preferably height adjustable. The turntable module comprises a rotatable base mounted on a stationary base; a wire frame mounted over the rotatable base; a first set of support elements extending from the wire frame having a first height relative to the rotatable base; and a second set of support elements extending from the wire frame having a second height relative to the rotatable base. Each one of the support elements includes a respective support finger that can be made of an elastomer such rubber, silicone, or urethane.

16 Claims, 8 Drawing Sheets

WORKPIECE TURNTABLE

TECHNICAL FIELD

The present disclosure relates generally to a workpiece turntable, and more particularly, to a workpiece turntable for holding and supporting at least one workpiece while work is performed thereon.

BACKGROUND

Refinishing or painting items, for example, drawers, panels, or doors of cabinets using a spray gun or the like can be time-consuming and tiring. The typical method involves thorough cleaning and degreasing of the cabinet surfaces, and lightly sanding if necessary. Thereafter, the drawers, panels, and doors are removed from the main structure for painting of each element of the cabinet individually.

There are a few methods in which the cabinet and cabinet elements are supported for being refinished or painted. One method involves laying each of the panels flat across sawhorses or the like and proceeding with the painting process. Another method involves leaning the panels against a vertical surface. Still another method involves laying the panels on paint stands such as painter's pyramids, cones, or the like. One problem with the conventional methods is that the painter must be careful to angle the spray gun at all portions of the panel equally so as not to have an uneven distribution of paint or finish thereon. Also, the conventional methods lack an important factor in achieving a good painting result, which is being able to easily move, and re-orient the articles being painted.

SUMMARY

A workpiece turntable comprises a turntable module and an attachable floor-engaging support. The floor-engaging support is preferably height adjustable. The turntable module comprises a rotatable base mounted on a stationary base; a wire frame mounted over the rotatable base; a first set of support elements extending from the wire frame having a first height relative to the rotatable base; and a second set of support elements extending from the wire frame having a second height relative to the rotatable base. Each one of the support elements includes a respective support finger that can be made of an elastomer such rubber, silicone, or urethane

DETAILED DESCRIPTION OF EXAMPLE EMBODIMENTS

Example embodiments of the disclosure now will be described more fully hereinafter with reference to the accompanying drawings, in which example embodiments are shown. The concepts discussed herein may, however, be embodied in many different forms and should not be construed as limited to the example embodiments set forth herein; rather, these embodiments are provided so that this disclosure will be thorough and complete, and will fully convey the scope to those of ordinary skill in the art. Like numbers refer to like elements but not necessarily the same or identical elements throughout.

Figure 1:
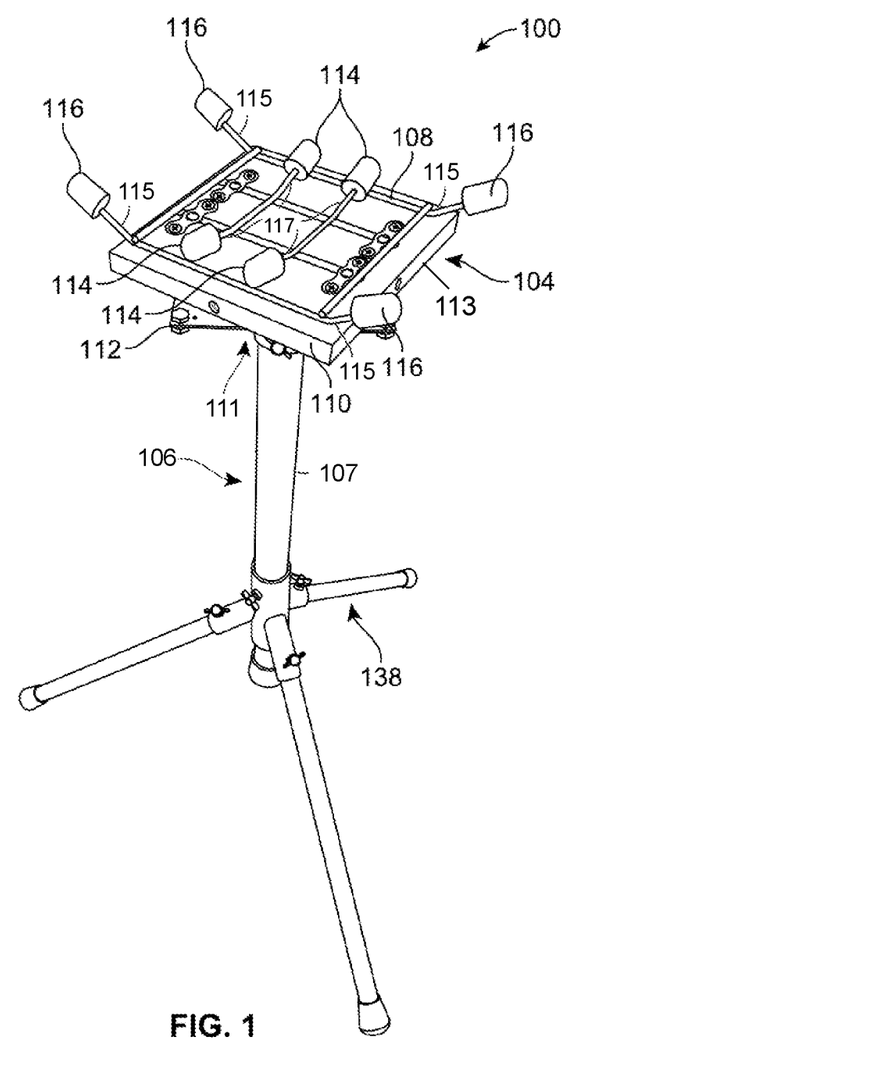
FIG. 1 exemplarily illustrates a perspective view of a workpiece turntable, according to an embodiment.

Referring to FIG. 1, a perspective view of an example workpiece turntable 100, according to an embodiment, is illustrated. The workpiece turntable 100 comprises a turntable module 104 and a floor-engaging support 106. In the illustrated embodiment, the floor-engaging support 106 includes a support tube 107 and a height-adjustable tripod 138, but another suitable support structure, preferably height-adjustable, can be used. Furthermore, it is to be understood that the turntable module 104 can be laid on a flat surface such as a table instead of being used with the floor-engaging support 106. As will be described in greater detail, the turntable module 104 is adapted for holding and rotating workpieces such as pieces of wood while work is performed on them. The turntable module 104 includes a rotating base 110. Preferably, the body of the rotating base 110 (base body 113) is constructed of a durable material, such as steel, aluminum, plywood, fiberboard (medium or high density), particle board, OSB, or a suitable hard plastic. In an embodiment, the base body 113 is about an inch in thickness and the top and bottom sides have a square shape. The rotating base 110 includes a rotation device 111 which allows it to rotate. In other embodiments, the top and bottom sides of the base body 113 can assume a different shape, such as a circular or an octagonal shape.

As shown, attached to a top surface of the rotating base 110, a wire frame 108 is secured. The wire frame 108 includes a first set of support elements 115 upwardly and angularly extending from the wire frame 108 having a first extension height relative to the rotatable base 110; and a second set of support elements 117 upwardly and angularly extending from the wire frame 108 having a second extension height relative to the rotatable base 110; wherein the second extension height is substantially greater than the first extension height. Each one of the first set of support elements 115 includes a respective support finger 114 on a distal end thereof. Similarly, each one of the second set of support elements 117 includes a respective support finger 116 on a distal end thereof. As shown, the support fingers 114, 116 are cylindrical with domed tips but other shapes may suffice so long as they allow sufficient grip to a workpiece. The support fingers 114, 116 can be made of an elastomer. Preferably, the support fingers 114, 116 can be made from either silicone or urethane, where the latter would be used for varnishes and the like that might chemically react with silicone.

Figure 2:
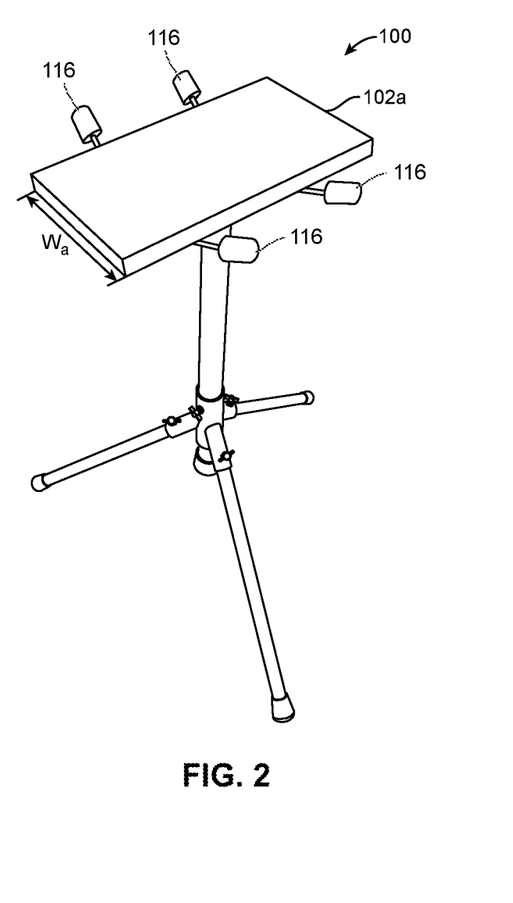
FIG. 2 exemplarily illustrates a perspective view of the workpiece turntable holding and supporting a first workpiece.

FIG. 2 illustrates a perspective view of the workpiece turntable 100 holding and supporting a first workpiece 102a. The first workpiece 102a is a relatively narrow workpiece such as a cabinet panel. Although not visible in FIG. 2, it is to be understood that the first workpiece is in contact with, and supported by, the support fingers 114. A suitable first workpiece 102a useable for support on the support fingers 114 will need to have a width $W_a$ falling within a certain width range such that it can be accommodated on the support fingers 114. For example, the width range might be from about four inches to about ten inches.

Figure 3:
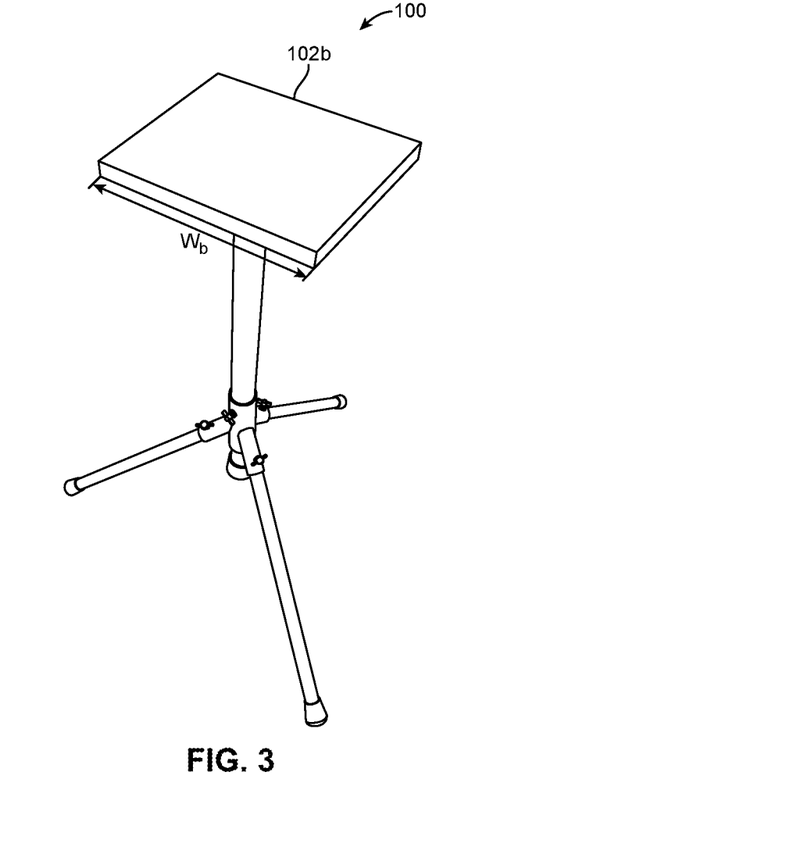
FIG. 3 exemplarily illustrates a perspective view of the workpiece turntable holding and supporting a second workpiece.

FIG. 3 illustrates a perspective view of the workpiece turntable 100 holding and supporting a second workpiece 102b. The second workpiece 102b is a relatively wide workpiece such as a cabinet door. Although not visible in FIG. 3, it is to be understood that the second workpiece 102b is in contact with, and supported by, the support fingers 116. It is to be understood that the second workpiece 102b would not be in contact with, and supported by, the support fingers 114 since the support fingers 114 are of lesser height than the support fingers 116 and do not reach the second workpiece 102b. A suitable first workpiece 102a useable for support on the support fingers 114 will need to have a width $W_b$ falling within a certain width range such that it can be accommodated on the support fingers 116. For example, the width range might a width greater than about fifteen inches.

Figure 4:
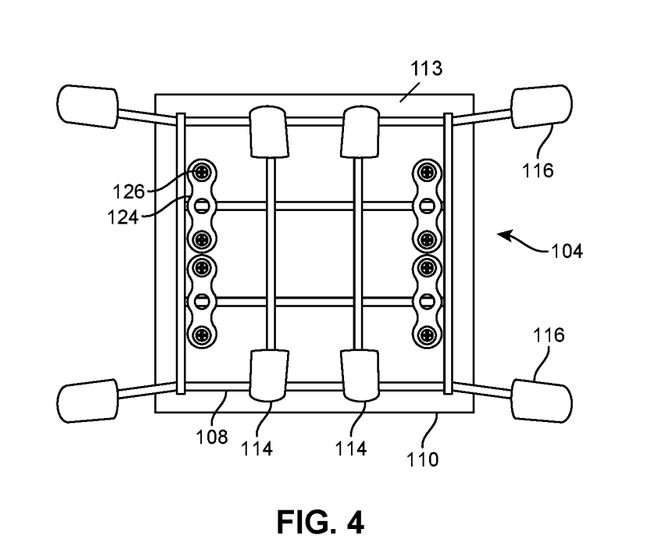
FIG. 4 exemplarily illustrates a top view of a turntable module of the assembly, according to an embodiment.

In usage a workpiece 102a, 102b is placed on top of at least one set of the support elements 114, 116 depending on the dimension of the workpiece 102a, 102b. Thereafter, the user can perform any desired operation, for example, spraying paint. The user may also rotate the rotatable base 110 by hand to reach all sides of the workpiece 102a, 102b and may later spray the top portion of the workpiece 102a, 102b. Advantageously, the workpiece turntable 100 allows pieces of wood or other materials to be individually placed thereon while they are being painted using a spray gun or the like. The workpiece turntable 100 facilitates the production of an evenly sprayed product. Additionally, the excess spray and fumes are directed downward and away from the user. The height adjustable configuration of the floor-engaging support 106 reduces back and muscle strain. FIG. 4 illustrates a top view of the turntable module 104, according to an embodiment. The support fingers 114, 116 can be detachably mounted to ends of the support elements 115, 117, respectively. The detachable configuration of the support fingers 114, 116 allows the replacement of the support elements 114, 116 as needed. In an embodiment, the support fingers 114, 116 may be color-coded, wherein the first set of support fingers 114 may have a color different than the color of the second set of support fingers 116. As another example, the color-coding may indicate the type of material that the support fingers 114 116 are made of (e.g., red for silicone, blue for urethane). The first set of support elements 115 and the second set of support elements 117 extend angularly from the frame 108. The frame 108 is fastened to the rotatable base 110 by brackets 124 and threaded bolts 126. The brackets 124 mounted on the frame 108 are fastened by threading the bolts 126 therethrough. Although the frame 108 is fastened to the rotatable base 110 in the mariner described above, it is to be understood that in other embodiments there can be other suitable ways to attach the frame 108 to the rotatable base 110 (e.g., using an adhesive, employing screws). Furthermore, in some embodiments the frame 108 can be made integral with the rotatable base 110, and in still other embodiments, the frame 108 can be entirely done away with. In the latter case, the support elements 116 117 extend directly from inside the rotatable base 110.

Figure 5:
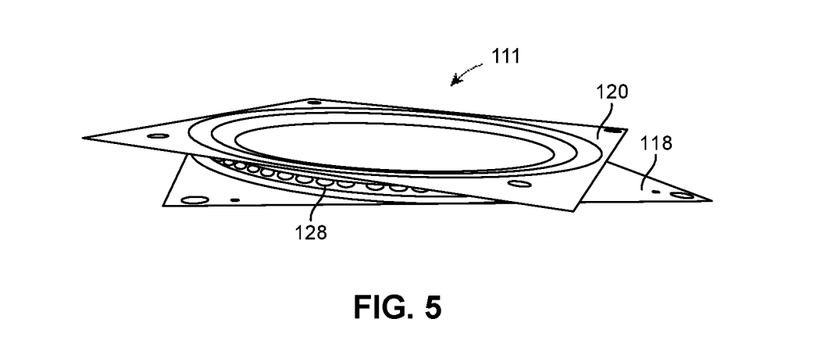
FIG. 5 exemplarily illustrates structural elements of a rotational device useable with the turntable module, according to an embodiment.

FIG. 5 illustrates structural elements of a rotational device 111 useable with the turntable module 110, according to an embodiment. The rotational device 111 includes a first plate 118 coaxially coupled to a second plate 120, the second plate fixedly attached to a bottom surface of the base body 113. The first plate 118 can be fixedly mounted to a stationary base 112 of the floor-engaging support 106 (or laid on a flat surface such as a table). Ball bearings 128 or the like configured to reduce friction between the first plate 118 and the second plate 120 are preferably used. The first plate 118 and the second plate 120 have a common axis. The second plate 120 is adapted to rotate around the common axis, thereby allowing the base body 113 to rotate with it, by hand manipulation.

Figure 6:
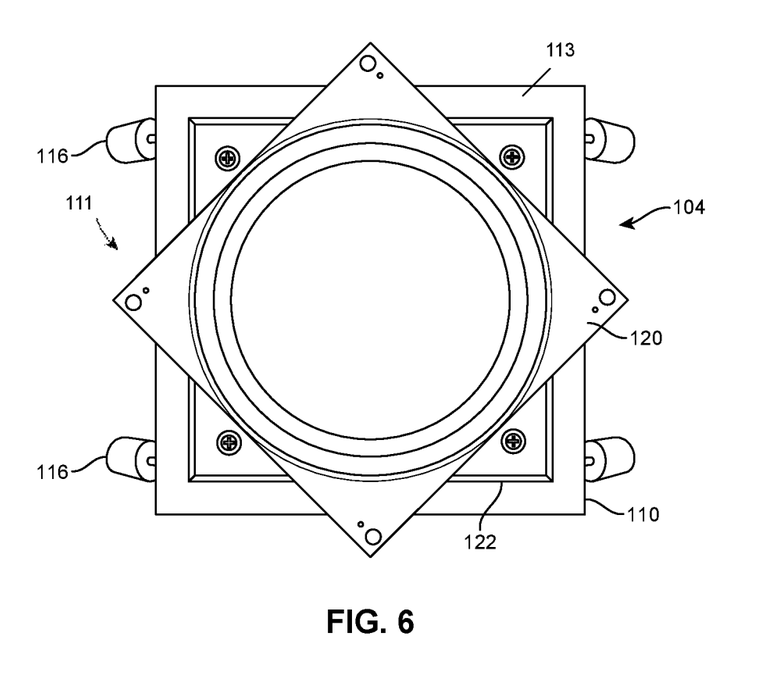
FIGS. 6 and 7 exemplarily illustrate a shielding layer, according to an embodiment.
Figure 7:
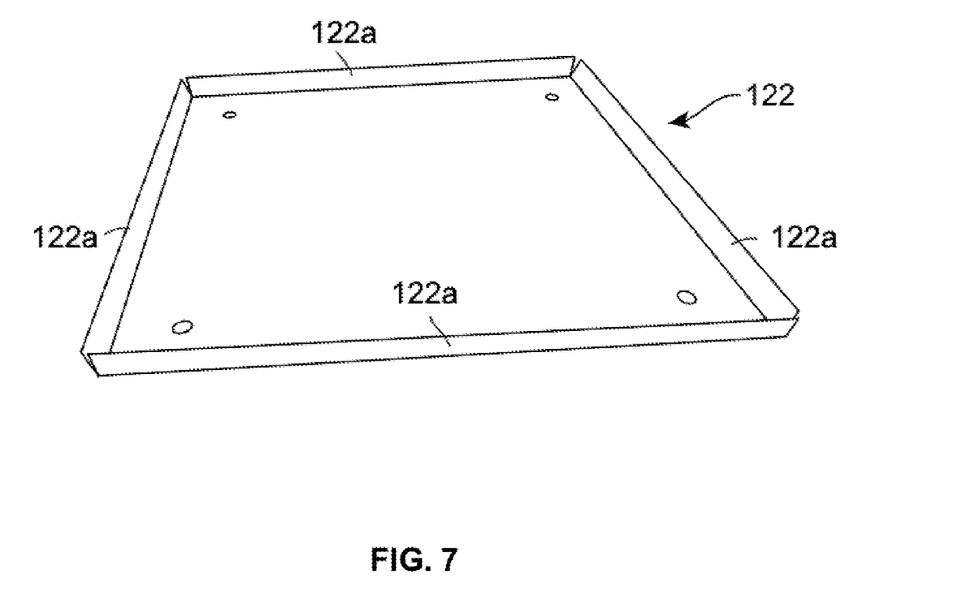

FIG. 6 exemplarily illustrates an example shielding layer 122 disposed beneath the base body 113. FIG. 7 illustrates a perspective view of the shielding layer 122, according to an embodiment. The shielding layer 122 can be secured to the bottom surface of the base body 113, such that bent edges 122a extend to partially (or fully) cover a gap between the first plate 118 and the second plate 120. In this manner, the ball bearings 128 can be protected. The shielding layer 122 can be made from paper or the like.

Figure 8:
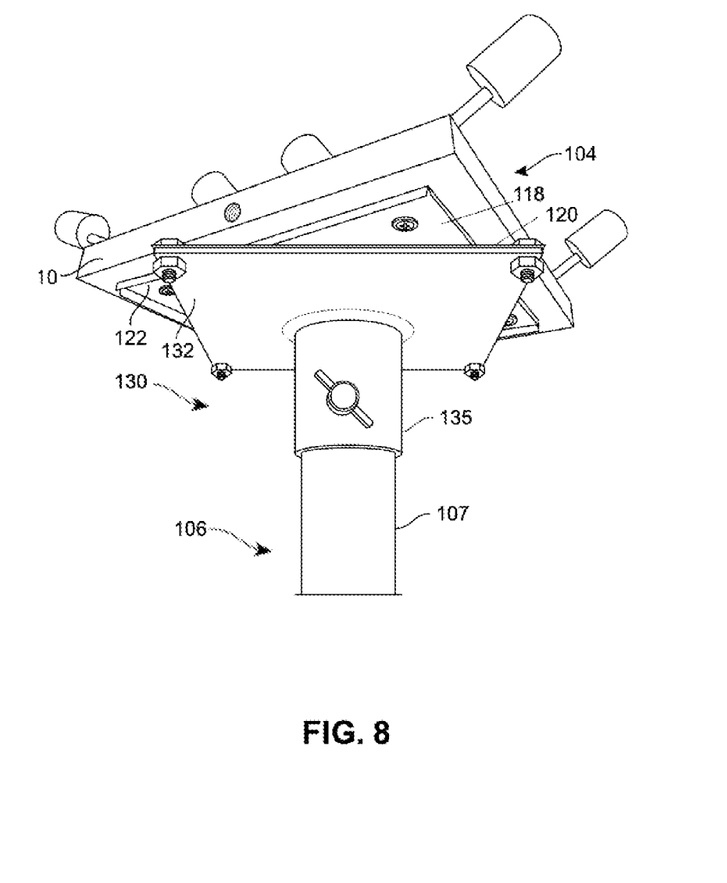
FIG. 8 exemplarily illustrates an example connector that attaches the turntable module and a floor-engaging support, according to an embodiment.

FIG. 8 illustrates an example connector 130 useable to attach the turntable module 104 to the floor-engaging support 106, according to an embodiment. The connector 130 has a T-shaped structure that includes a fitting portion 135 that is attachable to an upper tube 107 of the floor-engaging support 106 and an upper plate 132 that is attachable to the turntable module 104. The fitting portion 135 can be tubular having a circular cross-sectional shape slightly greater in diameter than a diameter of the upper tube 107. Although the upper tube 107 and the fitting portion 135 have circular cross-sectional shapes, it is to be understood that another cross-sectional shape (e.g., square, octagon) may be used. The connector 130 can be secured tightly by turning a threaded tensioner 132 or the like. The upper plate 132 can be a flat, square-shaped plate that is perpendicularly disposed on top of the fitting portion 135. The top and bottom sides of the upper plate 132 can be the approximate same length as the top and bottom sides of the first plate 118 to which it is secured (e.g., bolted).

Figure 9:
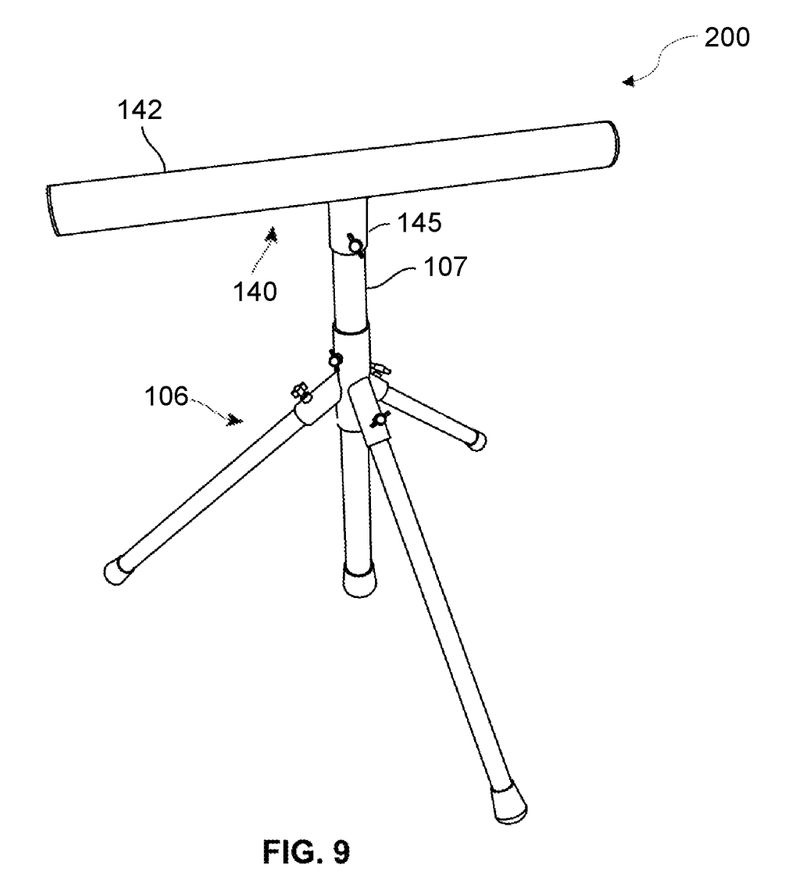
FIG. 9 exemplarily illustrates an example sawhorse module attachable to the floor-engaging support, according to an embodiment.

FIG. 9 illustrates an example sawhorse module 140 attachable to the floor-engaging support 106, according to an embodiment. The sawhorse module 140 has a T-shaped structure that includes a support fitting portion 145 and a sawhorse tube 142. The support fitting portion 145 can be the same or substantially similar to the fitting portion 135. The sawhorse tube 142 can include an elongated member (such as the illustrated tube) that perpendicularly is disposed on top of the support fitting portion 145. When the sawhorse module is attached to the floor-engaging support 106, as shown, it functions as a sawhorse 200 instead of the workpiece turntable 100. It is to be appreciated that the sawhorse 200 can be easily converted to the workpiece turntable 100 (and vice versa).

Although the features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A workpiece turntable, comprising:
a turntable module having:
a rotatable base;
a first set of support elements having a first height relative to the rotatable base;
a second set of support elements having a second height relative to the rotatable base; and
a frame attached to the rotatable base permitting the first set of support elements and the second set of support elements to extend upwardly and angularly;
wherein
the rotatable base includes a first plate coaxially coupled to a second plate, the second plate fixedly attached to a body of the rotatable base, a friction reducing bearing disposed between the first plate and the second plate, and a shielding layer that protects the friction reducing bearing; and
wherein
the first height is less than the second height; and
the shielding layer is a sheet of material that extends to cover a gap between the first plate and the second plate.

2. The workpiece turntable of claim 1, further comprising a plurality of finger supports, each one the finger supports attached to a distal end of one of the first and second support elements.

3. The workpiece turntable of claim 2, wherein the finger supports are made of an elastomer.

4. The workpiece turntable of claim 2, wherein at least one of the finger supports is made of silicone.

5. The workpiece turntable of claim 2, wherein at least one of the finger supports is made of urethane.

6. The workpiece turntable of claim 1, wherein
the first set of support elements is adapted to support a workpiece having a first width range; and
the second set of support elements is adapted to support a workpiece having a second width range.

7. The workpiece turntable of claim 6, wherein the first width range is less than the second width range.

8. The workpiece turntable of claim 1, further comprising a floor-engaging support that supports the turntable module in an upright position upon a floor.

9. The workpiece turntable of claim 8, wherein the floor-engaging support is height adjustable.

10. The workpiece turntable of claim 8, further comprising a sawhorse tube attachable to the floor-engaging support to form a sawhorse.

11. The workpiece turntable of claim 8, wherein the floor-engaging support includes a T-shaped connector.

12. The workpiece turntable of claim 11, wherein the T-shaped connector includes a plate attachable to the rotatable base.

13. The workpiece turntable of claim 1, wherein the friction reducing bearing includes ball bearings.

14. The workpiece turntable of claim 1, wherein the shielding layer is made of paper.

15. The workpiece turntable of claim 1, wherein the shielding layer has bent edges, the bent edges covering the gap between the first plate and the second plate.

16. A workpiece turntable, comprising:
a turntable module having:
a rotatable base;
a first set of support elements having a first height relative to the rotatable base;
a second set of support elements having a second height relative to the rotatable base; and
a frame attached to the rotatable base permitting the first set of support elements and the second set of support elements to extend upwardly and angularly;
wherein
the rotatable base includes a first plate coaxially coupled to a second plate, the second plate fixedly attached to a body of the rotatable base, a friction reducing bearing disposed between the first plate and the second plate, and a shielding layer that protects the friction reducing bearing; and
wherein
the first height is less than the second height; and
the shielding layer is a sheet of paper that extends to cover a gap between the first plate and the second plate.

* * * * *